US008644307B2

(12) United States Patent
Fujiwara et al.

(10) Patent No.: US 8,644,307 B2
(45) Date of Patent: Feb. 4, 2014

(54) COMMUNICATION TRANSFER APPARATUS AND COMMUNICATION TRANSFER METHOD

(75) Inventors: Hidehiko Fujiwara, Kanagawa (JP); Naoki Mori, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 256 days.

(21) Appl. No.: 12/630,341

(22) Filed: Dec. 3, 2009

(65) Prior Publication Data

US 2010/0080220 A1    Apr. 1, 2010

Related U.S. Application Data

(62) Division of application No. 11/012,218, filed on Dec. 16, 2004, now Pat. No. 7,643,479.

(30) Foreign Application Priority Data

Dec. 17, 2003    (JP) .................................. 2003-419635

(51) Int. Cl.
| | | |
|---|---|---|
| *H04L 12/26* | (2006.01) | |
| *H04L 12/28* | (2006.01) | |
| *H04L 1/00* | (2006.01) | |
| *H04J 3/16* | (2006.01) | |
| *H04M 1/24* | (2006.01) | |
| *H04M 7/00* | (2006.01) | |

(52) U.S. Cl.
USPC ........... 370/389; 370/216; 370/228; 370/242; 370/252; 370/270; 370/437; 379/1.04; 379/32.01; 379/201.01; 379/201.03; 379/201.07

(58) Field of Classification Search
None
See application file for complete search history.

(56) References Cited

U.S. PATENT DOCUMENTS

| | | | |
|---|---|---|---|
| 5,548,578 A | | 8/1996 | Matsune et al. |
| 5,904,013 A | * | 5/1999 | Greenspan et al. ...... 379/211.04 |
| 6,331,984 B1 | * | 12/2001 | Luciani .......................... 370/401 |
| 6,667,974 B1 | | 12/2003 | Shigeta |
| 6,832,322 B1 | | 12/2004 | Boden et al. |
| 7,159,033 B2 | | 1/2007 | Etoh |

(Continued)

FOREIGN PATENT DOCUMENTS

| | | |
|---|---|---|
| JP | 07-131478 | 5/1995 |
| JP | 11-205475 | 7/1999 |

(Continued)

OTHER PUBLICATIONS

Srisuresh P et al.: "Middlebox Communication Architecture and Framework" IETF RFC, Aug. 2002, pp. 1-35, XP002296447.

(Continued)

*Primary Examiner* — Hassan Phillips
*Assistant Examiner* — Lonnie Sweet
(74) *Attorney, Agent, or Firm* — Foley & Lardner LLP

(57) ABSTRACT

A communication transfer apparatus and a communication transfer method can transfer communications at low cost without the need of requesting a global IP network to switch any port number. The local internet protocol address of the origin terminal of transfer described in a record relating to a transfer out of the records of the masquerade table that is utilized for an internet protocol masquerade is rewritten as the local internal protocol address of the destination terminal of transfer, while maintaining the global port number of the record.

6 Claims, 15 Drawing Sheets

(56) References Cited

U.S. PATENT DOCUMENTS

| | | | |
|---|---|---|---|
| 7,206,088 B2 | 4/2007 | Tanimoto | |
| 7,606,859 B2* | 10/2009 | Shiga et al. | 709/204 |
| 2002/0091834 A1* | 7/2002 | Isozu et al. | 709/227 |
| 2003/0016795 A1* | 1/2003 | Brandenberger | 379/93.11 |
| 2004/0153549 A1 | 8/2004 | Naito et al. | |

FOREIGN PATENT DOCUMENTS

| | | |
|---|---|---|
| JP | 2000-286882 | 10/2000 |
| JP | 2000-341313 | 12/2000 |
| JP | 2002-176432 | 6/2002 |
| JP | 2002-315029 | 10/2002 |
| JP | 2003-046665 | 2/2003 |
| JP | 2003-085063 | 3/2003 |

OTHER PUBLICATIONS

J. Lennox, H. Schulzrinne: "Call Processing Language Framework and Requirements" IETF Network Working Group, May 2000, pp. 1-25, XP015008607.

Fredrik Thernelius: "SIP, NAT, and Firewalls" Masters Thesis, 'Online! May 2000, pp. 1-69, XP002321865.

J.D. Rosenberg, R. Shockey: "The Session 1-10, Initiation Protocol (SIP): A Key Component 13-22 for Internet Telephony" ComputerTelephony.com, 'Online! Jun. 2000, pp. 124-139, XP002321864.

* cited by examiner

FIG.3

| GLOBAL IP ADDRESS | GLOBAL PORT NUMBER | LOCAL IP ADDRESS | LOCAL PORT NUMBER |
|---|---|---|---|
| 10.10.20.1 | 50001 | 192.168.0.11 | 60001 |
| 10.10.20.1 | 50002 | 192.168.0.12 | 60003 |
| 10.10.20.1 | 50009 | 192.168.0.19 | 60001 |

| EXTENSION NUMBER | LOCAL IP ADDRESS |
|---|---|
| #001 | 192.168.0.11 |
| #002 | 192.168.0.12 |
| ⋯ | ⋯ |
| #009 | 192.168.0.19 |

| USER NAME | PRIORITY | EXTENSION NUMBER |
|---|---|---|
| A | 1 | #001 |
| A | 2 | #004 |
| A | 3 | #007 |
| B | 1 | #002 |
| B | 2 | #005 |
| ... | ... | ... |

| EXTENSION NUMBER | PRESENCE/ABSENCE |
|---|---|
| #001 | PRESENCE |
| #002 | ABSENCE |
| #009 | PRESENCE |

| USER NAME | PRIORITY | EXTENSION NUMBER |
|---|---|---|
| A | 1 | 192.168.0.11 |
| A | 2 | 192.168.0.14 |
| A | 3 | 192.168.0.17 |
| B | 1 | 192.168.0.12 |
| B | 2 | 192.168.0.15 |
| ... | ... | ... |

| LOCAL IP ADDRESS | PRESENCE/ ABSENCE |
|---|---|
| 192.168.0.11 | PRESENCE |
| 192.168.0.12 | ABSENCE |
| 192.168.0.19 | PRESENCE |

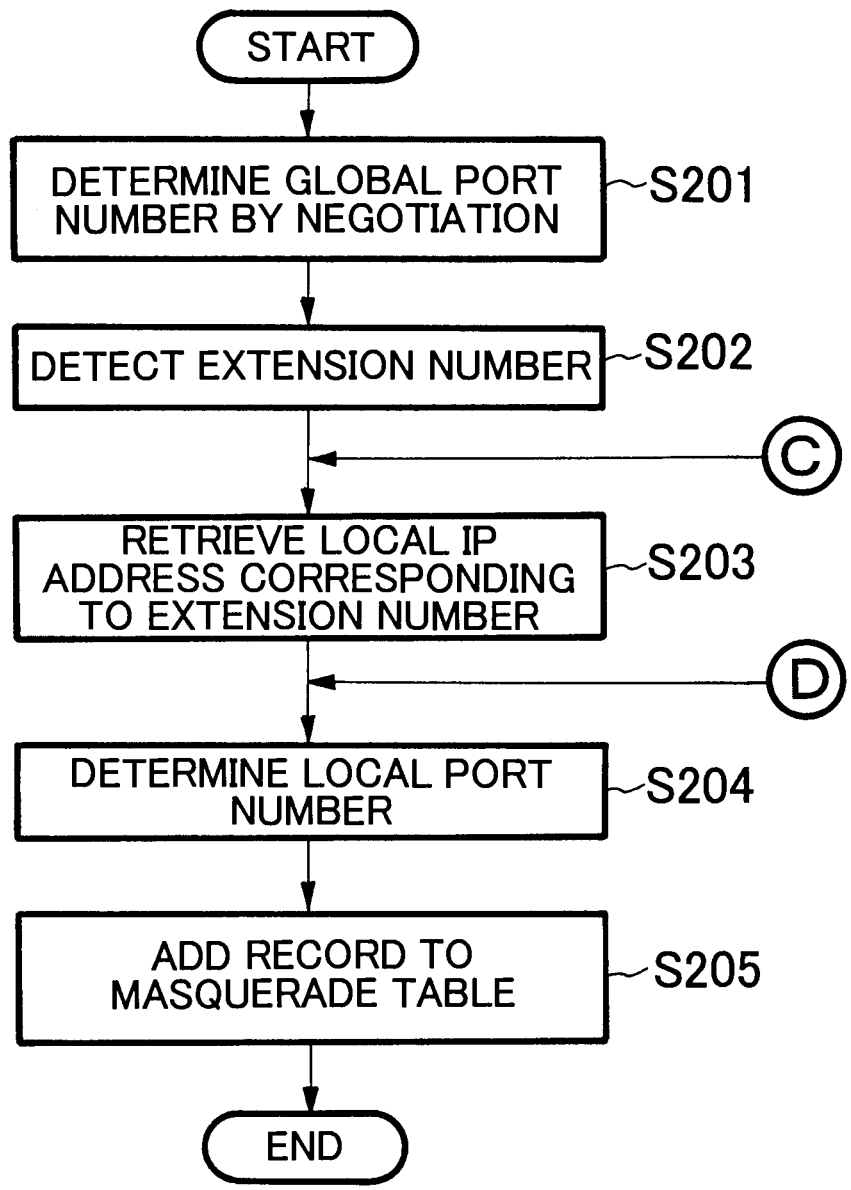

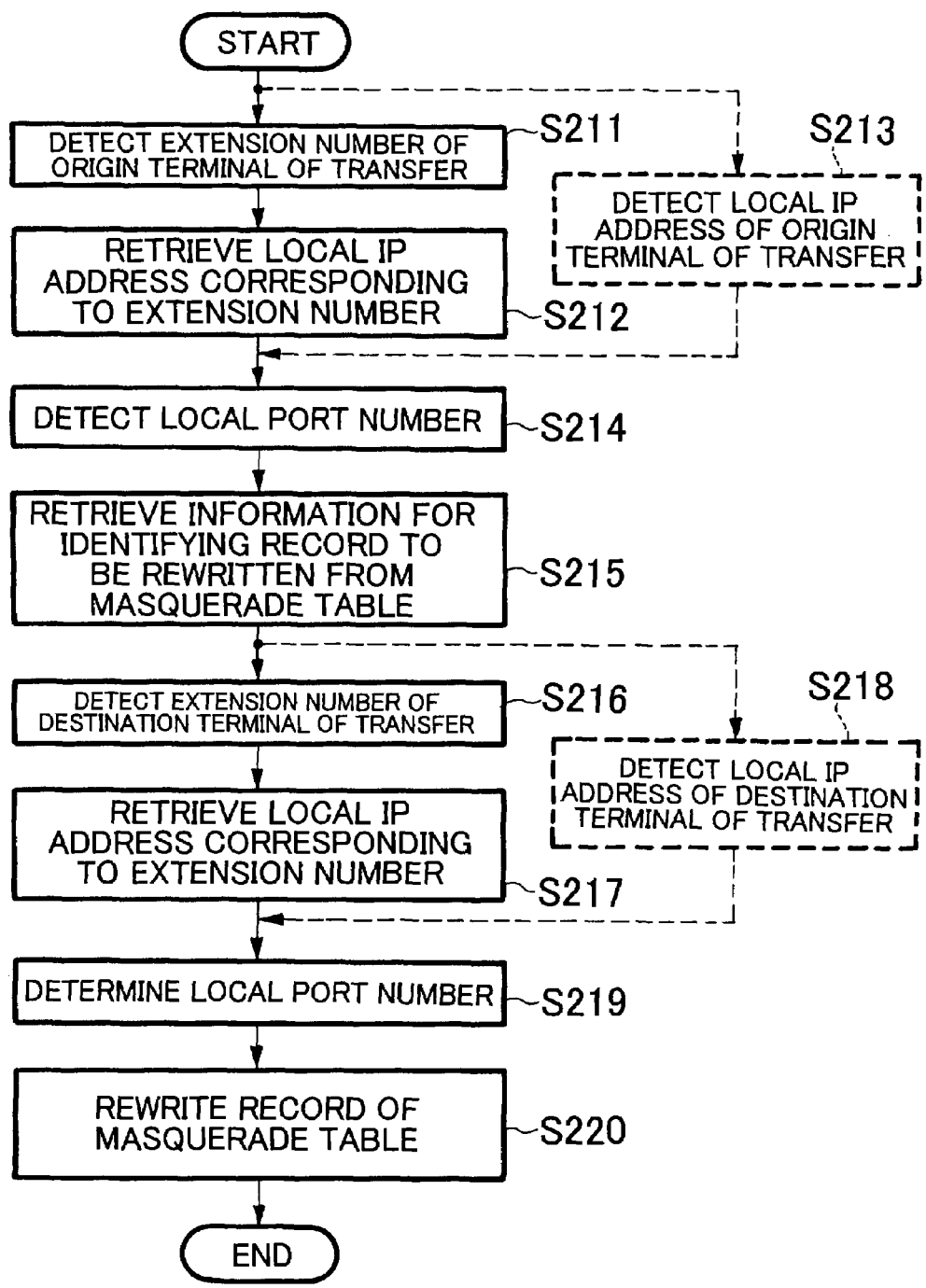

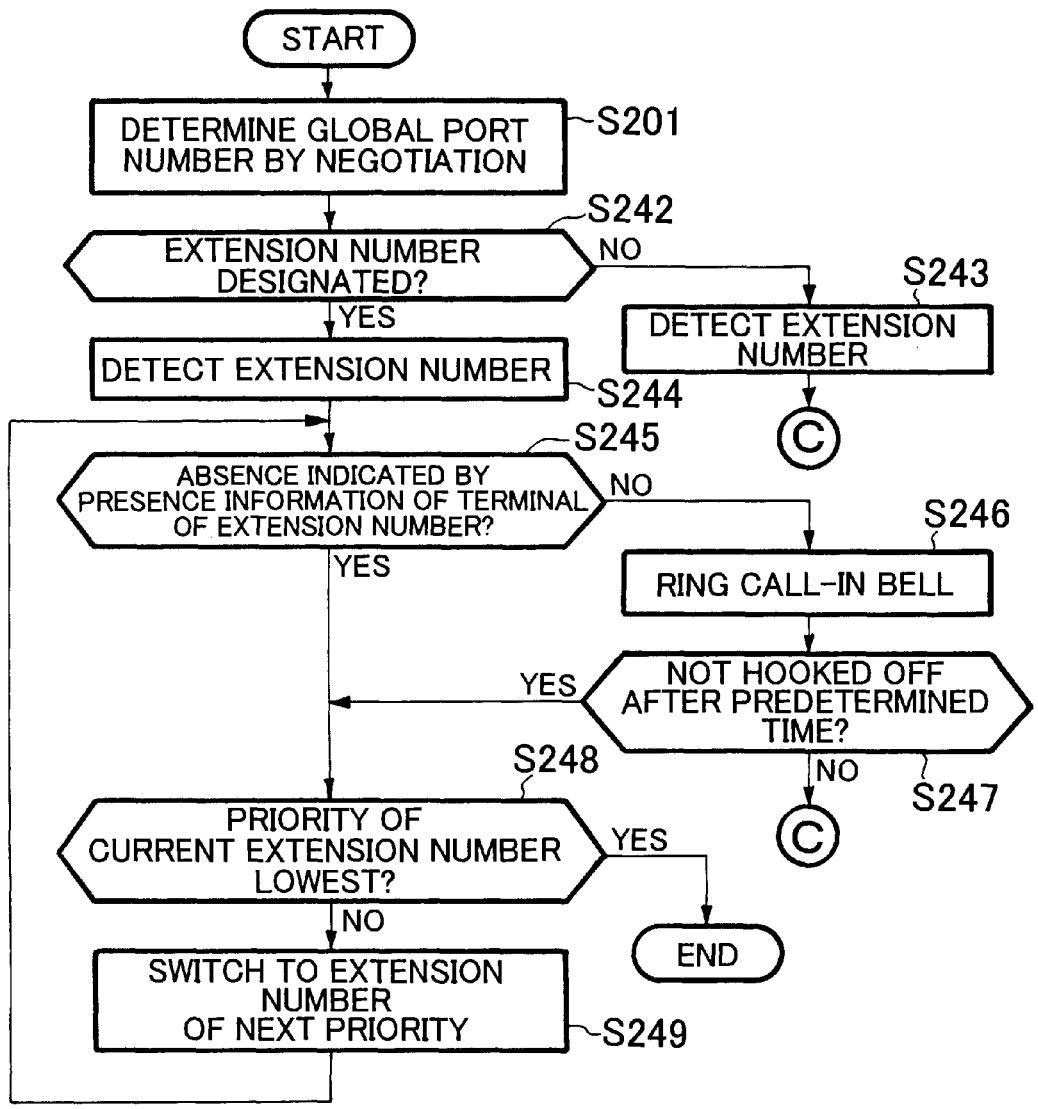

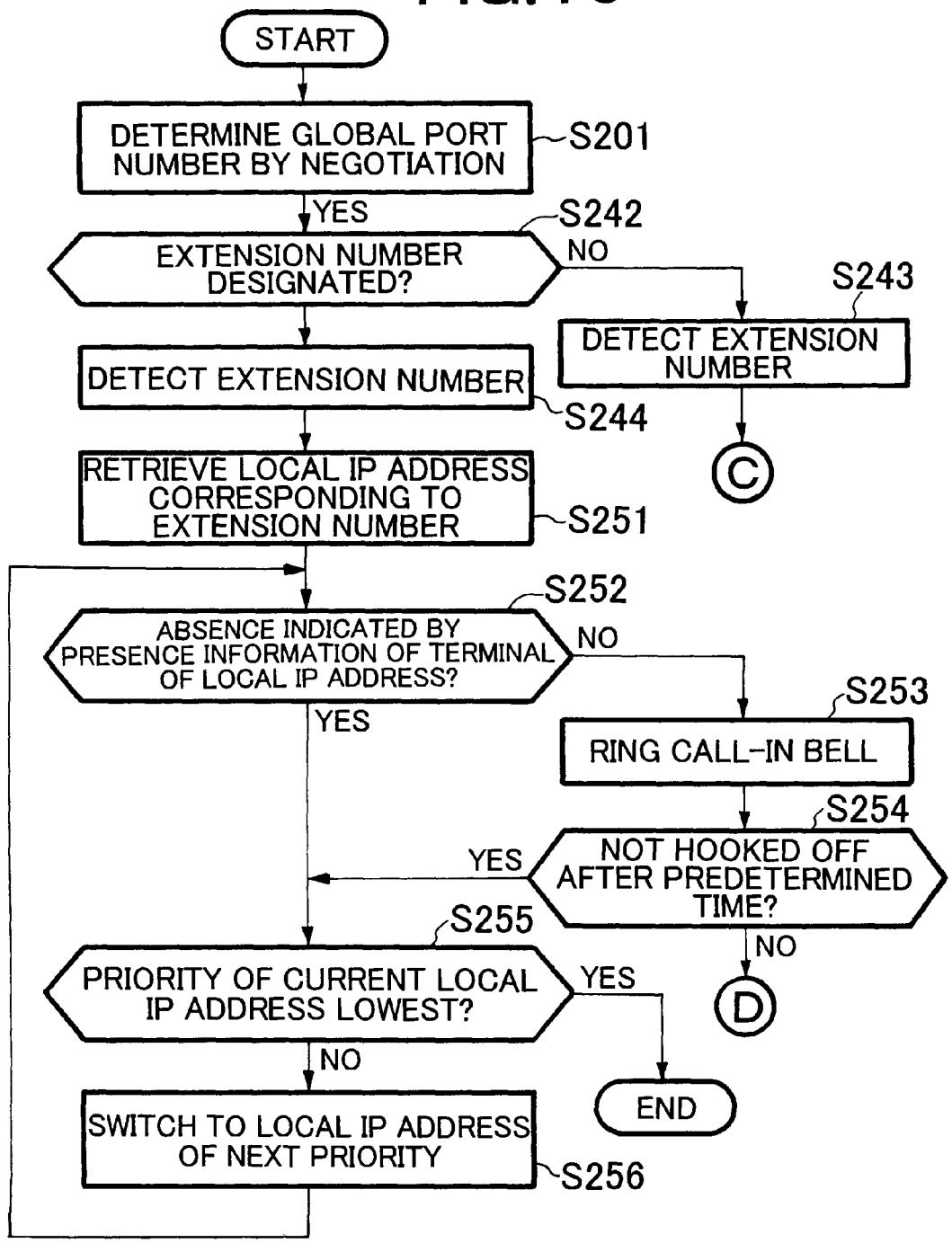

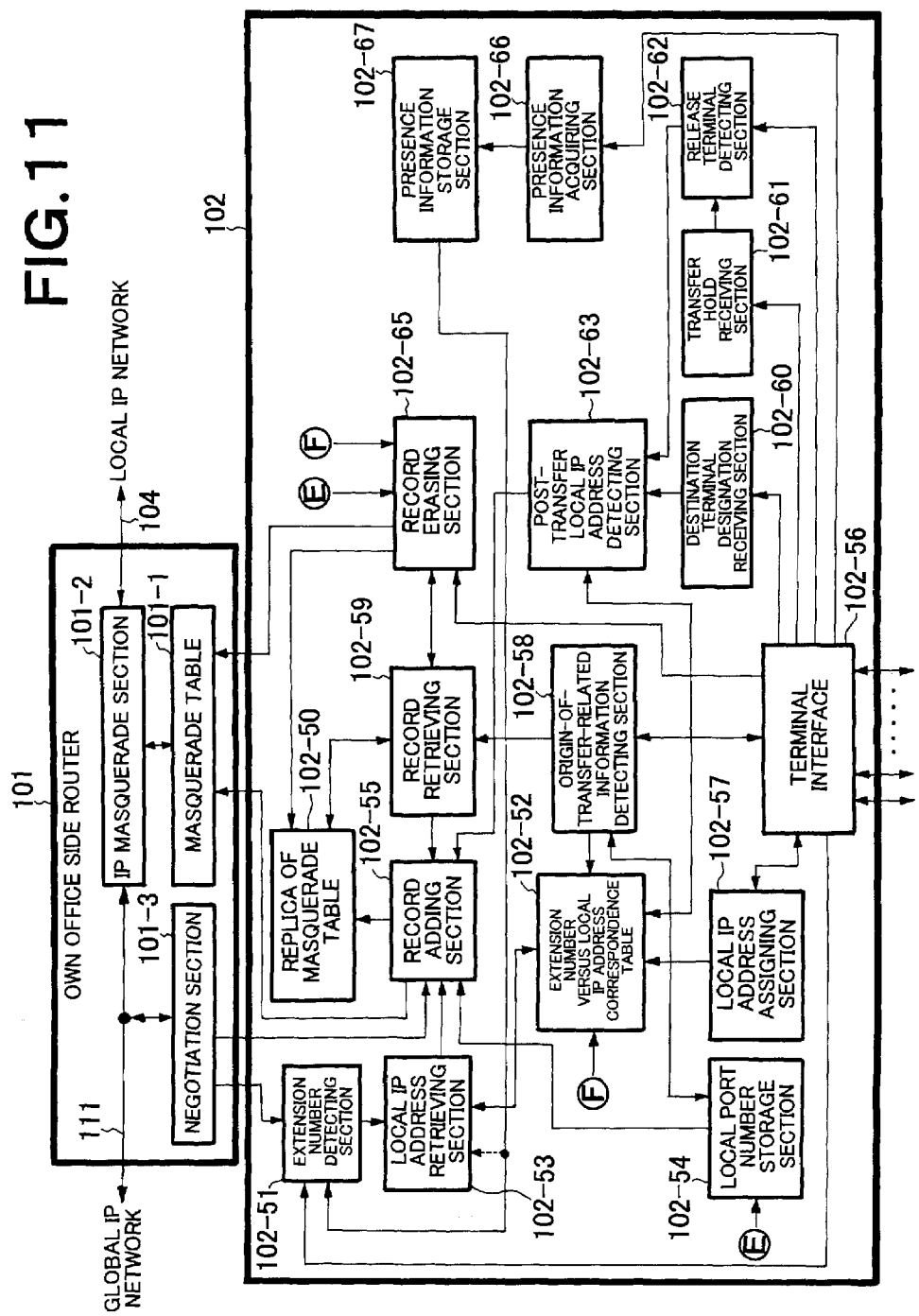

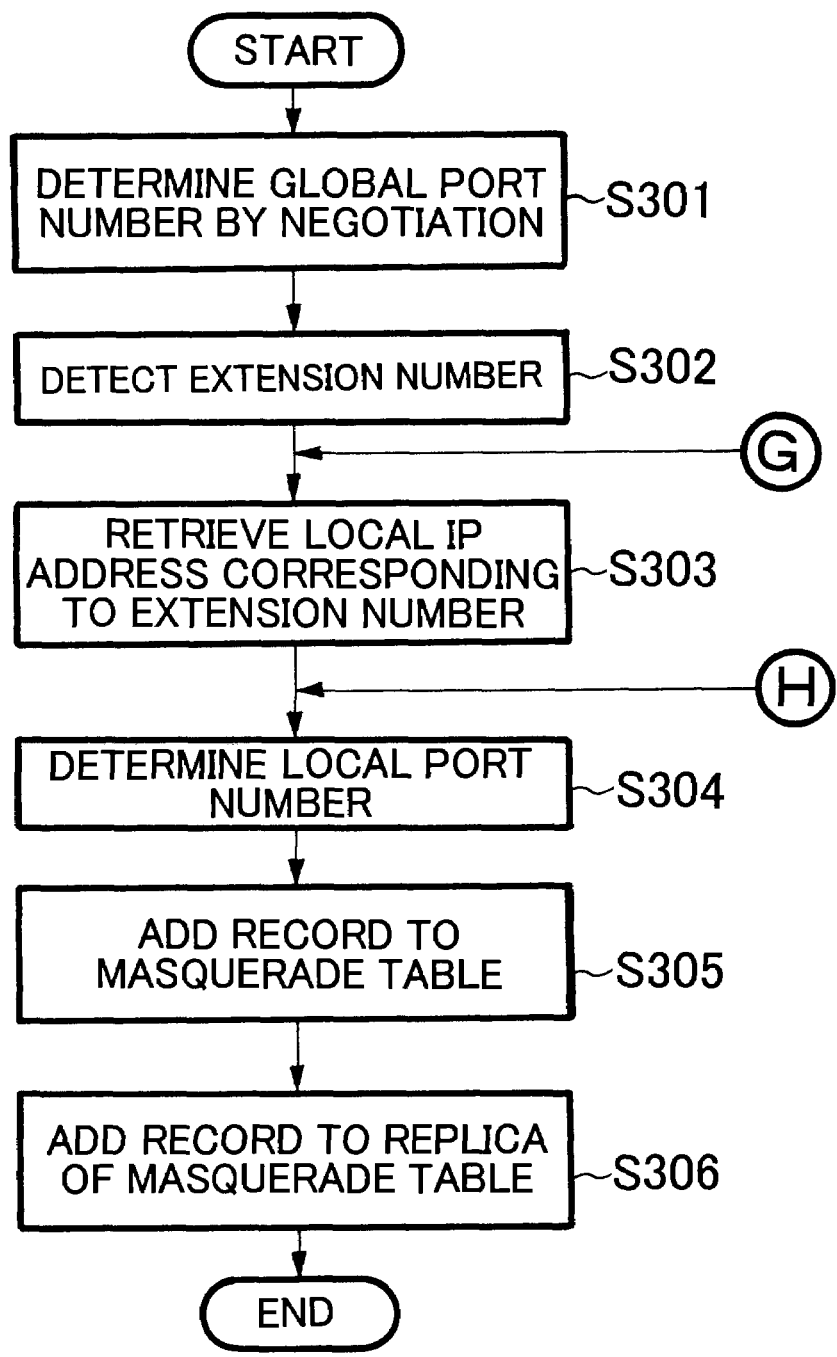

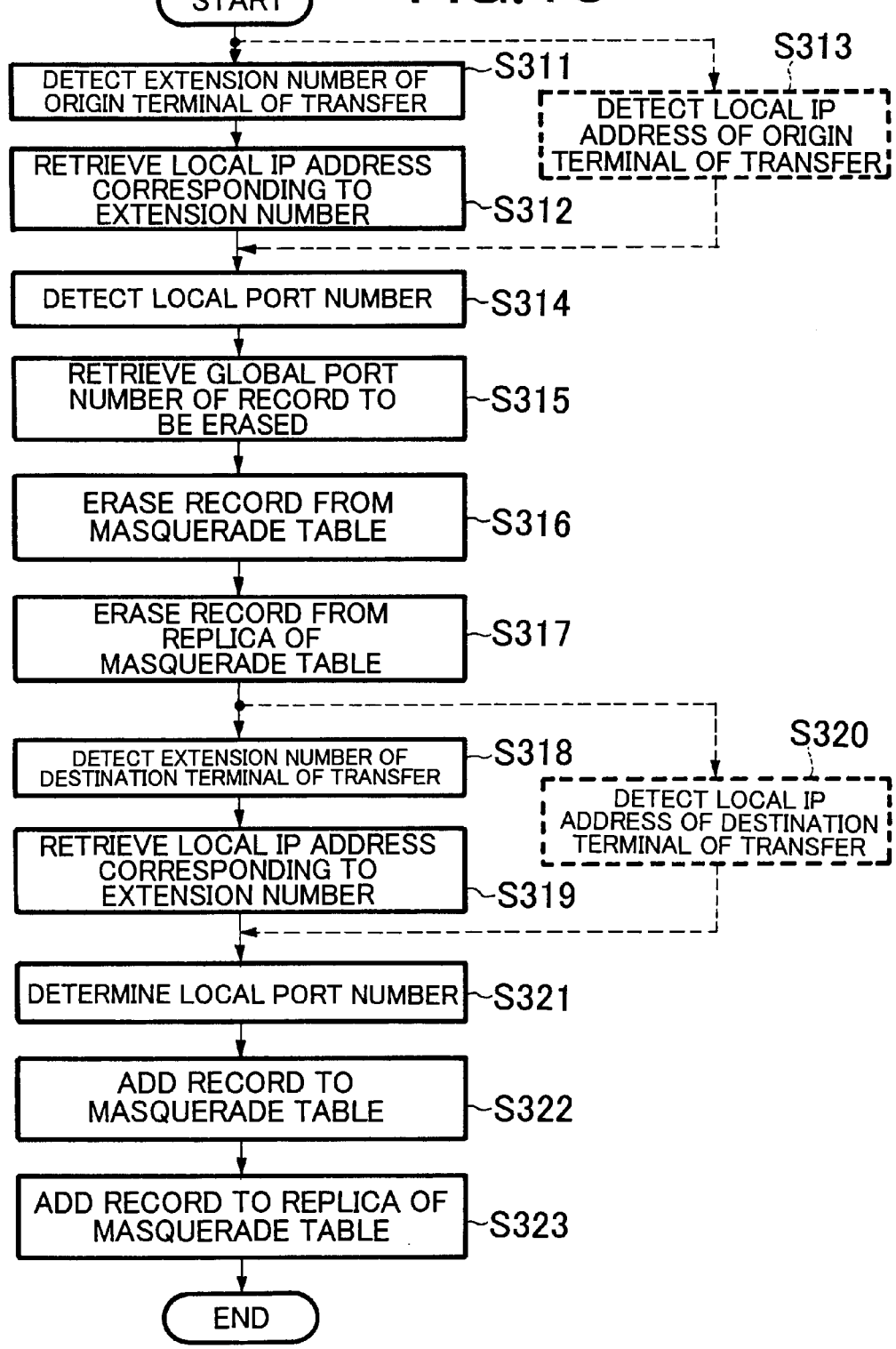

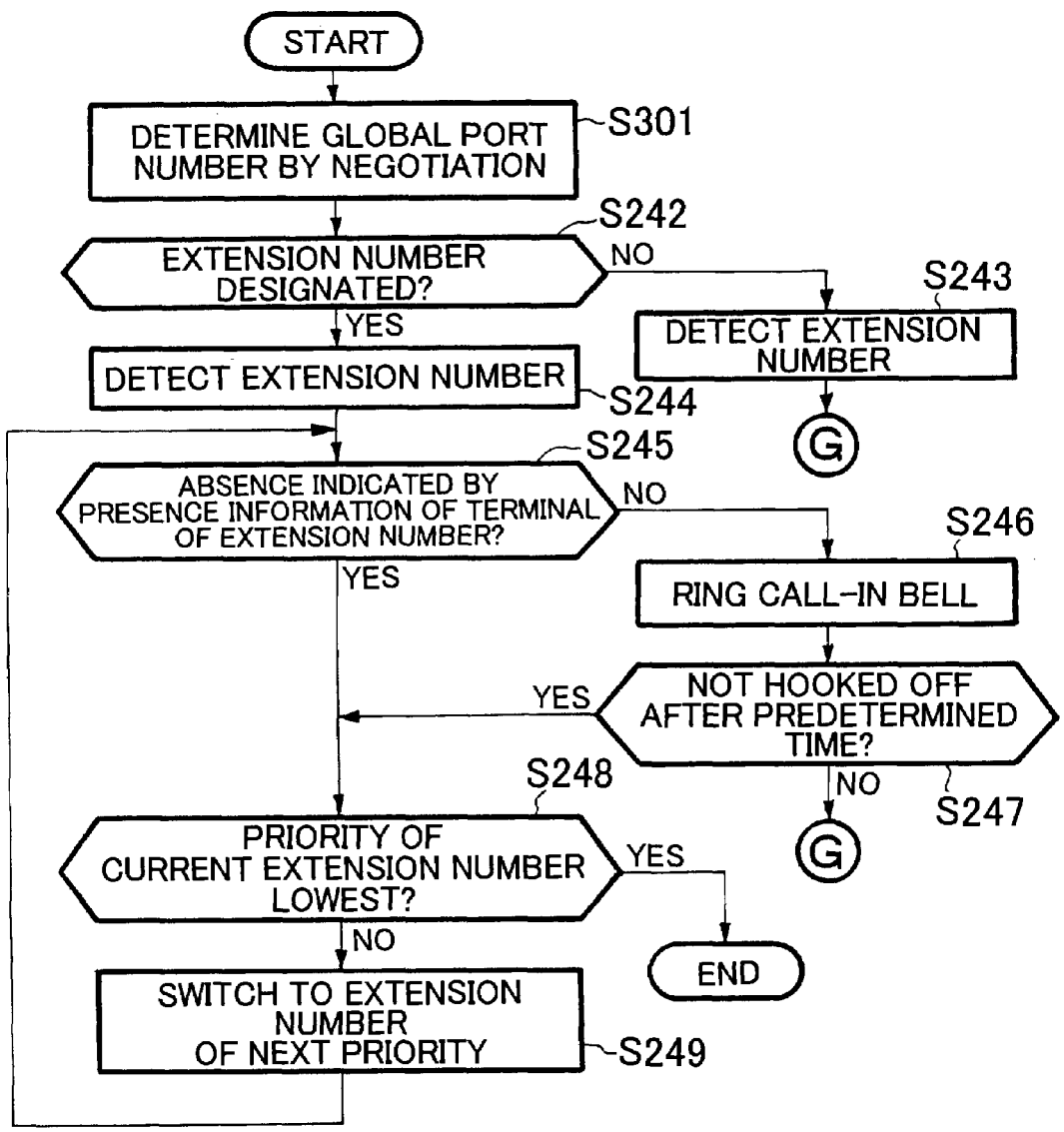

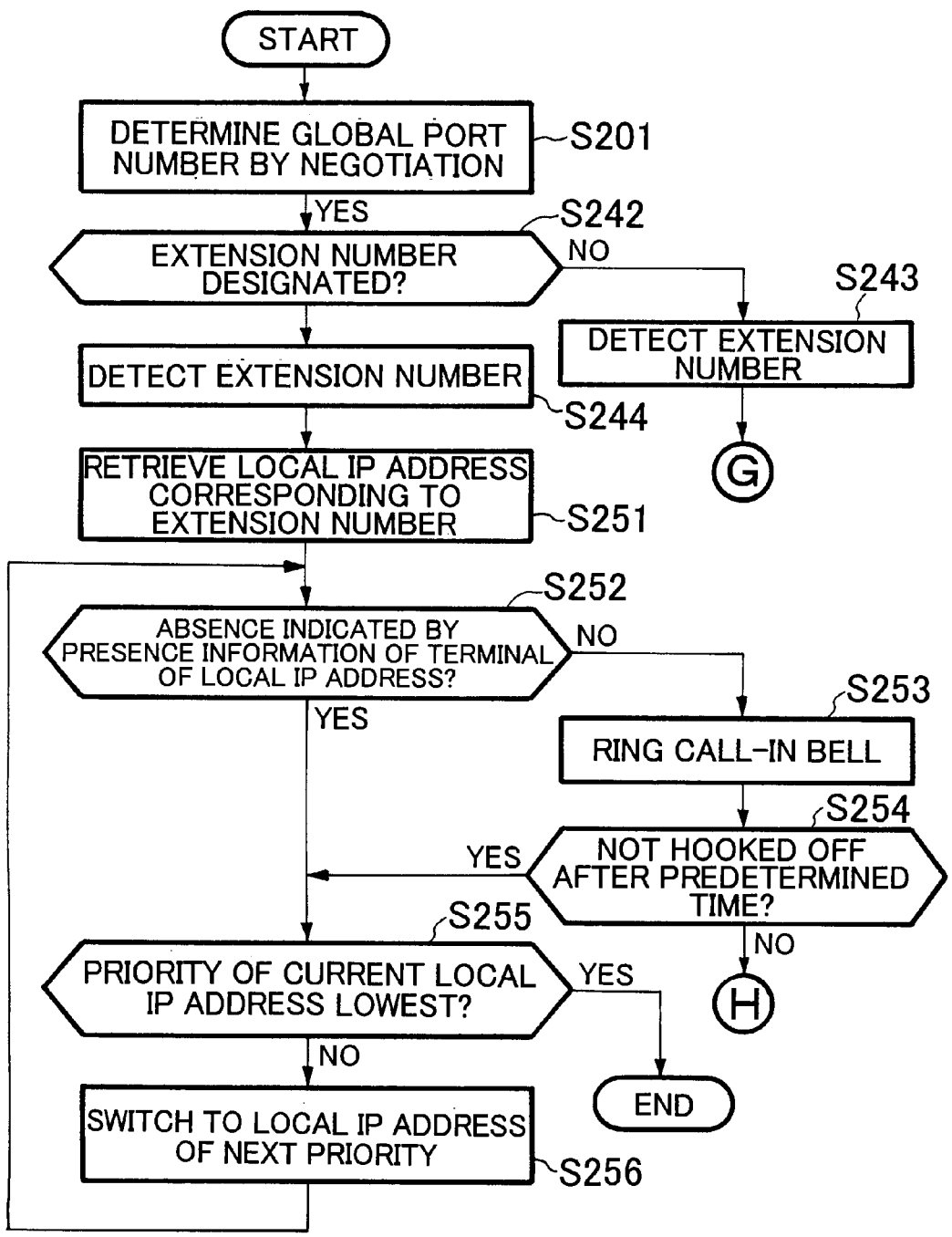

COMMUNICATION TRANSFER APPARATUS AND COMMUNICATION TRANSFER METHOD

This application is a division of application Ser. No. 11/012,218, filed Dec. 16, 2004, now pending, based on Japanese Patent Application No. 2003-419635, filed Dec. 17, 2003, by Hidehiko FUJIWARA and Naoki MORI, which is incorporated herein by reference in their entirety. This application claims only subject matter disclosed in the parent application and therefore presents no new matter.

BACKGROUND OF THE INVENTION

1. Field of the Invention

This invention relates to a communication transfer apparatus and a communication transfer method for transferring communications. More particularly, the present invention relates to a communication transfer apparatus and a communication transfer method for switching a terminal communicating with another terminal by way of the global IP (internet protocol) network to some other terminal belonging to the local IP network to which the first terminal belongs.

2. Related Background Art

As the development of Internet-related technologies, IP telephony that utilizes the Internet is becoming very popular. With IP telephony, a voice communication can proceed by means of RTP (real-time transport protocol) or some other protocol once a communication line is established by signaling by means of SIP (session initiation protocol), H.323 protocol or some other protocol.

Technological documents that describe the conventional art relating to the present invention include JP 11-205475 A, JP 2000-286882 A and JP 2003-46665 A.

However, the IP telephony that is becoming popular has a prerequisite that a single IP telephone terminal is connected to a single router that is installed in an office or a home.

In other words, when there is an IP telephone call, the router establishes a corresponding relationship between the combination of the global IP address and the global port number and the combination of the local IP address and the local port number of the called terminal by means of the technique of NAT (network address translation) or IP masquerade and the corresponding relationship continues as long as the IP telephone communication proceeds.

Therefore, if more than one IP telephone terminals are connected to the router, it may be conceivable to use either of the following two techniques in order to transfer the IP telephone communication of an IP telephone terminal to another IP telephone terminal.

The first one is to request the global network or the other end of the line to change the global port number that corresponds to the local IP address and the local port number of the IP telephone terminal before the transfer to the global port number that corresponds to the local IP address and the local port number of the IP telephone terminal of the destination of transfer.

However, any existing Internet service provider cannot accommodate such a request and any existing router cannot accommodate such a request either.

The second conceivable technique is to terminate the IP packets to be used with the other end of the line for IP telephone communication and install a particular device for IP telephone communications in the local IP network.

However, while an IP telephone communication can be realized between two terminals on a peer to peer basis, installing such a device for the purpose of termination and redistribution will again raise the cost that has been reduced once.

The above-identified problem arises not only in IP telephone communications but also in visual phone communications, television games and communications using messengers.

SUMMARY OF THE INVENTION

In view of the above described circumstances, it is therefore an object of the present invention to provide a communication transfer apparatus and a communication transfer method that eliminate the necessity of requesting the global IP network (Internet) to switch the port number and allow to transfer communications at low cost.

According to a first aspect of the present invention, there is provided a communication transfer apparatus comprising rewriting means for rewriting a local internet protocol address of an origin terminal of transfer described in a record relating to the transfer out of records of a masquerade table which is utilized for an internet protocol masquerade into a local internet protocol address of a destination terminal of the transfer, while maintaining a global port number of the record.

The communication transfer apparatus according to the first aspect may further comprise: local internet protocol address of origin of transfer detecting means for detecting a local internet protocol address of an origin of the transfer assigned to the origin terminal of the transfer; and local port number of origin of transfer detecting means for detecting a local port number of the origin of the transfer utilized by the origin terminal of the transfer, wherein said rewriting means identifies the record relating to the transfer by the local internet protocol address of the origin of the transfer detected by said local internet protocol address of origin of transfer detecting means and the local port number of the origin of the transfer detected by said local port number of origin of transfer detecting means.

The communication transfer apparatus according to the first aspect may further comprise: an extension number versus local internet protocol address correspondence table storing a relationship between an extension number assigned to each terminal and a local internet protocol address assigned to the terminal; and extension number of origin of transfer detecting means for detecting the extension number of the origin of the transfer assigned to the origin terminal of the transfer, wherein said local internet protocol address of origin of transfer detecting means detects a local internet protocol address corresponding to the extension number of the origin of the transfer detected by said extension number of origin of transfer detecting means from said extension number versus local internet protocol address correspondence table as the local internet protocol address of the origin of the transfer.

The communication transfer apparatus according to the first aspect may further comprise: local internet protocol address of destination of transfer detecting means for detecting a local internet protocol address of a destination of transfer assigned to the destination terminal of the transfer, wherein said rewriting means rewrites the local internet protocol address of the origin terminal of the transfer described in the record relating to the transfer into a local internet protocol address of the destination of transfer detected by said local internet protocol address of destination of transfer detecting means.

The communication transfer apparatus according to the first aspect may further comprise: an extension number versus local internet protocol address correspondence table storing a relationship between an extension number assigned to each terminal and a local internet protocol address assigned to the terminal; and extension number of destination of transfer detecting means for detecting the extension number of the destination of the transfer assigned to the destination terminal of the transfer, wherein said local internet protocol address of destination of transfer detecting means detects a local internet protocol address corresponding to the extension number of the destination of transfer detected by said extension number of destination of transfer detecting means from said extension number versus local internet protocol address correspondence table as the local internet protocol address of the destination of transfer.

In the communication transfer apparatus according to the first aspect, said rewriting means may realize the rewrite by erasing the record relating to the transfer and adding a record describing a global port number identical with the global port number described in the erased record and the local internet protocol address of the destination terminal of the transfer to said masquerade table.

The communication transfer apparatus according to the first aspect may further comprise: local internet protocol address of origin of transfer detecting means for detecting a local internet protocol address of an origin of the transfer assigned to the origin terminal of the transfer; local port number of origin of transfer detecting means for detecting a local port number of the origin of the transfer utilized by the origin terminal of the transfer; a replica of said masquerade table; and retrieving means for retrieving a global port number corresponding to the local internet protocol address of the origin of the transfer detected by said local internet protocol address of origin of transfer detecting means and the local port number detected by said local port number of origin of transfer detecting means from the replica, wherein said rewriting means identifies the record relating to the transfer by the global port number retrieved by said retrieving mans and write the global port number detected by said retrieving means into the added record.

According to a second aspect of the present invention, there is provided a communication transfer apparatus comprising: presence information storing means for storing information on presence or absence of a user at each terminal and information on priorities of terminals for each user; called terminal detecting means for detecting a called terminal; presence determining means for determining presence or absence of a user at the called terminal detected by said called terminal detecting means by referring to said presence information storing means; destination of transfer identifying means for identifying a terminal having a next priority by referring to said presence information storing means if said presence determining means determines absence of a user at the called terminal detected by said called terminal detecting means; and record creating means for creating a record describing a local internet protocol address of the terminal identified by said destination of transfer identifying means as well as a global port number and local port number to be used for communication to a masquerade table utilized for an internet protocol masquerade.

According to a third aspect of the present invention, there is provided a communication transfer apparatus comprising: priority storing means for storing information on priorities of terminals for each user; called terminal detecting means for detecting a called terminal; presence determining means for determining execution or non-execution of a hooking off operation at the called terminal detected by said called terminal detecting means within a predetermined period of time; destination of transfer identifying means for identifying a terminal having a priority next to a priority of the called terminal by referring to said priority storing means if said presence determining means determines non-execution of the hooking off operation at the called terminal detected by said called terminal detecting means within the predetermined period of time; and record creating means for creating a record describing a local internet protocol address of the terminal identified by said destination of transfer identifying means as well as a global port number and local port number to be used for communication to a masquerade table utilized for an internet protocol masquerade.

Thus, according to the invention, it is no longer necessary to request the global IP network (Internet) to switch the port number so that it is possible to transfer communications at low cost.

Additionally, according to the invention, an effect similar to that of rewriting a masquerade table can be obtained by erasing a record and adding another record, referring to a replica of the masquerade table if it is not possible to acquire information therefrom for identifying the record of the masquerade table to be rewritten and if it is not possible to directly rewrite the record of the masquerade table.

BRIEF DESCRIPTION OF THE DRAWINGS

FIG. 3 is a schematic illustration of the masquerade table of FIGS. 2 and 11, showing the configuration thereof;

FIG. 4 is a schematic illustration of the extension number versus local IP address correspondence table of FIGS. 2 and 11, showing the configuration thereof;

FIG. 5 is a schematic illustration of the first format of information to be stored in the presence information storage section of FIGS. 2 and 11;

FIG. 6 is a schematic illustration of the second format of information to be stored in the presence information storage section of FIGS. 2 and 11;

FIG. 7 is a flow chart of the operation of the call control device and other related components of the first embodiment of the present invention at the time of starting a communication;

FIG. 8 is a flow chart of the operation of the call control device and other related components of the first embodiment of the present invention at the time of a transfer;

FIG. 9 is a flow chart of the operation that is conducted by using the presence information of the call control device and other related components and by using the first method at the time of starting a communication of the first embodiment of the present invention;

FIG. 10 is a flow chart of the operation that is conducted by using the presence information of the call control device and other related components and by using the second method at the time of starting a communication of the first embodiment 1 of the present invention;

FIG. 11 is a schematic block diagram of the own office side router and the call control device of a second embodiment of the present invention, illustrating the configuration thereof;

FIG. 12 is a flow chart of the operation of the call control device and other related components of the second embodiment of the present invention at the time of starting a communication;

FIG. 13 is a flow chart of the operation of the call control device and other related components of the second embodiment of the present invention at the time of a transfer;

FIG. 14 is a flow chart of the operation that is conducted by using the presence information of the call control device and other related components and by using the first method at the time of starting a communication of the second embodiment 2 of the present invention; and FIG. 15 is a flow chart of the operation that is conducted by using the presence information of the call control device and other related components and by using the second method at the time of starting a communication of the second embodiment of the present invention.

DETAILED DESCRIPTION OF THE PREFERRED EMBODIMENTS

Now, the present invention will be described by referring to the accompanying drawings that illustrate the preferred embodiments of carrying out the invention.

[Embodiment 1]

Figure 1:
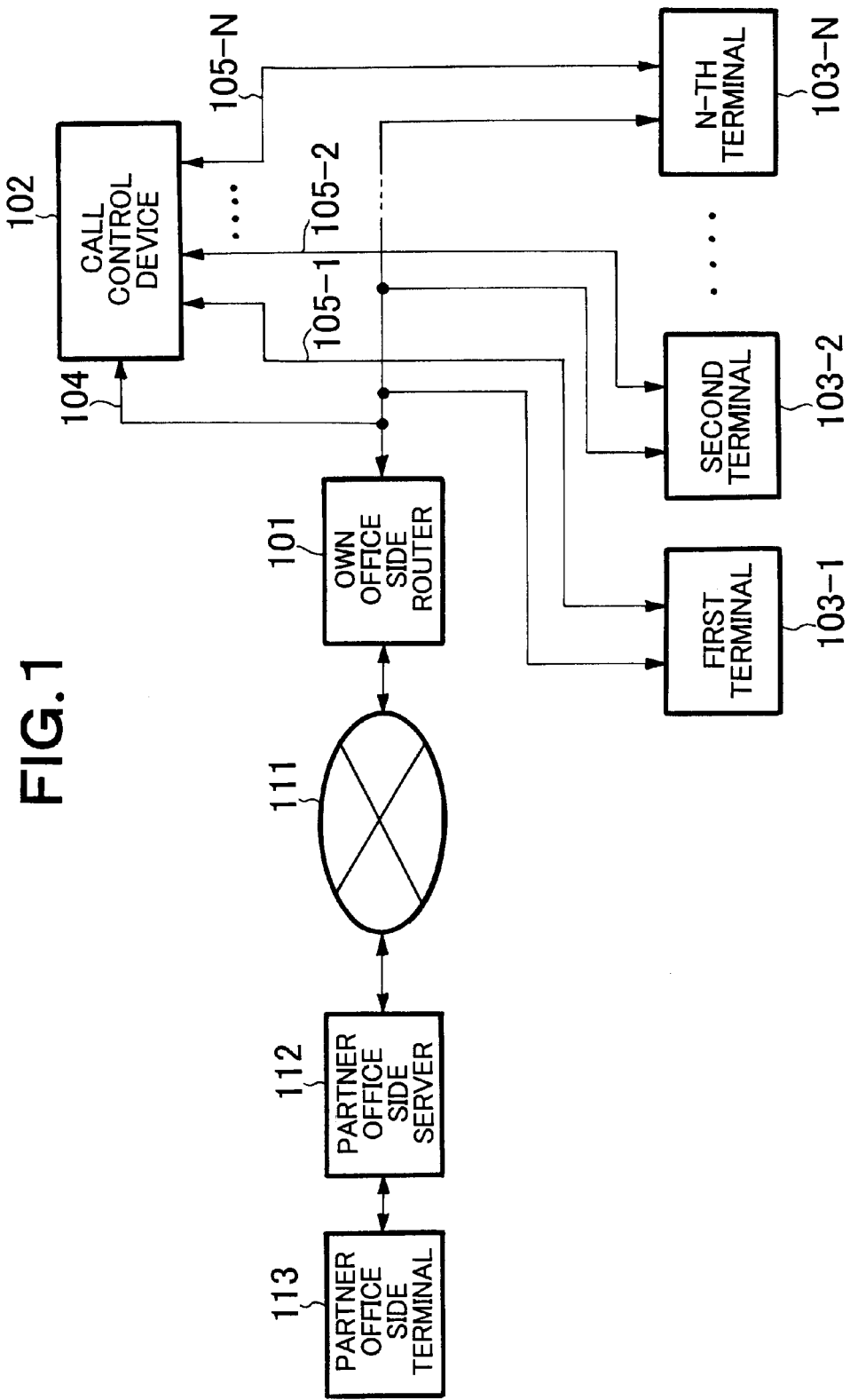
FIG. 1 a schematic block diagram of a communication system realized by means of an embodiment of the present invention, illustrating the configuration thereof.

FIG. 1 a schematic block diagram of a communication system realized by means of an embodiment of the present invention, illustrating the configuration thereof. An own office has an own office side router 101, a call control device 102 and first through N-th terminals including a first terminal 103-1, a second terminal 103-2, ..., an N-th terminal 103-N. The own office side router 101, the call control device 102 and the first terminal 103-1, the second terminal 103-2, ..., the N-th terminal 103-N are connected to a local IP network 104. The call control device 102 is connected to the first terminal 103-1, the second terminal 103-2, ..., the N-th terminal 103-N by way of respective control lines 105-1, 105-2, ..., 105-N.

The partner office has a partner office side server 112 and a partner office side terminal 113.

The own office side router 101 and the partner office side server 112 are connected to each other by way of a global IP network (the Internet) 111. Therefore, the partner office side terminal 113 is adapted to communicate with any of the first terminal 103-1, the second terminal 103-2, ..., the N-th terminal 103-N by way of the partner office side server 112, the global IP network 111 and the own office side router 101.

Figure 2:
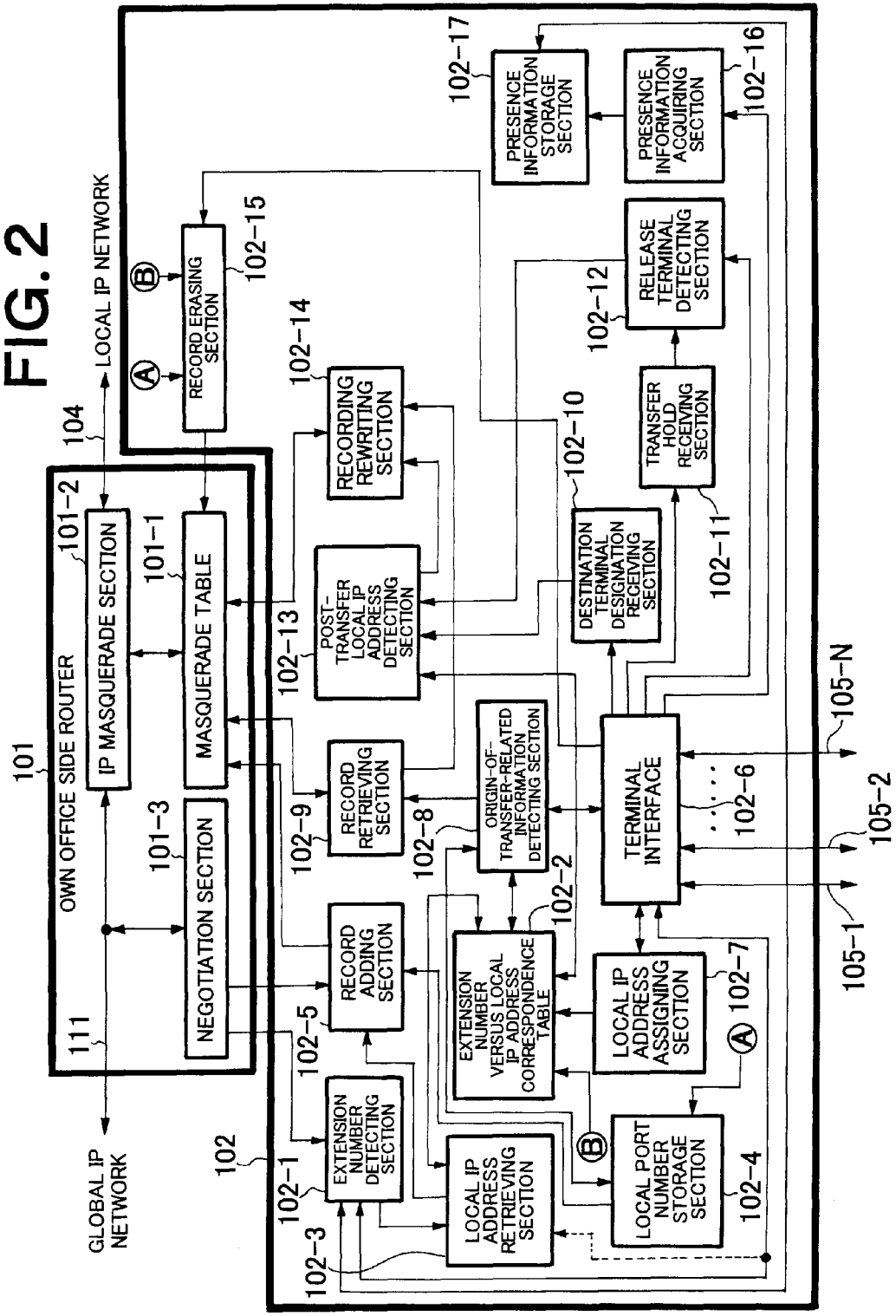
FIG. 2 is a schematic block diagram of the own office router and the call control device of a first embodiment of the present invention, illustrating the configuration thereof.

As shown in FIG. 2, the own office side router 101 is provided with a masquerade table 101-1, an IP masquerade section 101-2 and a negotiation section 101-3. The own office side router 101 additionally has functional sections (not shown) that an ordinary router is normally provided with.

As shown in FIG. 3, the masquerade table 101-1 stores one or more records each describing a relationship between a combination of a global IP address and a global port number and a combination of a local IP address and a local port number. In the example of FIG. 3, the first record describes that the combination of global IP address 10.10.20.1 and global port number 50001 corresponds to the combination of local IP address 192.168.0.11 and local port number 60001. In this embodiment, a record may be added to, modified in or erased from the masquerade table 101-1 appropriately whenever necessary. The global IP address may be omitted from the masquerade table 101-1. An IP masquerade can be realized even if the global IP address is omitted from the masquerade table 101-1, because it is possible to know which global port number corresponds to which combination of a local IP address and a local port number.

The IP masquerade section 101-2 conducts an IP masquerade by referring to the masquerade table 101-1.

At the time of signaling, the negotiation section 101-3 negotiates with the partner office side server 112. As a result of the negotiation, the partner office side server 112 determines the global port number to be utilized typically by the UDP/IP for RTP packet transmission or some other transmission and notifies the determined global port number to record adding section 102-5. The determined global port number is not changed as long as the communication continues.

As shown in FIG. 2, the call control device 102 has an extension number detecting section 102-1, an extension number versus local IP address correspondence table 102-2, a local IP address retrieving section 102-3, a local port number storage section 102-4, a record adding section 102-5, a terminal interface 102-6, a local IP address assigning section 102-7, an origin-of-transfer-related information detecting section 102-8, a record retrieving section 102-9, a destination terminal designation receiving section 102-10, a transfer hold receiving section 102-11, a release terminal detecting section 102-12, a post-transfer local IP address detecting section 102-13, a recording rewriting section 102-14, a record erasing section 102-15, a presence information acquiring section 102-16 and a presence information storage section 102-17.

When the partner office side terminal 113 designates the direct telephone number of a particular one of the first through N-th terminals 103-1 through 103-N, the extension number detecting section 102-1 detects the extension number of the terminal on the basis of the direct telephone number. Then, the extension number detection section 102-1 requests the terminal interface 102-6 to ring a call-in bell of the terminal, using the extension number. When, on the other hand, the partner office side terminal 113 calls the representative telephone number, the extension number detecting section 102-1 requests the terminal interface 102-6 to ring a call-in bells of all the terminals. Then, the extension number detecting section 102-1 is notified of the extension number of the terminal that is hooked off first by the terminal interface 102-6.

As shown in FIG. 4, the extension number versus local IP address correspondence table 102-2 stores one or more records each describing a relationship between an extension number assigned to a terminal and a local IP address assigned to the terminal.

The local IP address retrieving section 102-3 receives an extension number from the extension number detecting section 102-1 and retrieves the local IP address corresponding to the received extension number from the extension number versus local IP address correspondence table 102-2. The retrieved local IP address then becomes the local IP address of the terminal that is to start a communication.

The local port number storage section 102-4 holds the local port number that corresponds to the type of the coming communication.

At the time of signaling, the record adding section 102-5 receives the global IP address and the global port number to be used for the coming communication from the negotiation section 101-3. Note, however, that it is not necessary for the record adding section 102-5 to receive the global IP address from the negotiation section 101-3 when the global IP address of the own office side router 101 is known or when no field is provided for global IP addresses in the masquerade table 101-1. Additionally, at the time of signaling, the record adding section 102-5 receives the local IP address to be used for the coming communication (the local IP address of the terminal to be used for the coming communication) from the local IP address retrieving section 102-3. Furthermore, at the time of signaling, the record adding section 102-5 receives the local port number to be used for the coming communication from the local port number storage section 102-4. Then, the record adding section 102-5 adds a record describing the global IP address, the global port number, the local IP address and the local port number it has received to the masquerade table 101-1. Note, however, that the added record describes only the global port number, the local IP address and the local port number when no field is provided for global IP addresses in the masquerade table 101-1.

The record adding section 102-5 may determine the local port number by negotiating with the terminal with which it is going to communicate. The record adding section 102-5 may receive a designated local port number although the record adding section 102-5 has the initiative of the negotiation in hand.

The terminal interface 102-6 communicates with the first terminal 103-1, the second terminal 103-2, . . . , the N-th terminal 103-N for the purpose of controlling the call.

The local IP address assigning section 102-7 receives the local IP address of the terminal that is to be newly added as extension from this terminal, adds a new extension number that is generated internally and adds a record describing the new local IP address and the new extension number to the extension number versus local IP address correspondence table 102-2.

The origin-of-transfer-related information detecting section 102-8 detects the extension number or the local IP address of the terminal requesting transfer of communication. When the origin-of-transfer-related information detecting section 102-8 detects the extension number of the terminal requesting transfer of communication, the origin-of-transfer-related information detecting section 102-8 retrieves the local IP address corresponding to the extension number from the extension number versus local IP address correspondence table 102-2. Additionally, the origin-of-transfer-related information detecting section 102-8 detects the type of the communication of which transfer is requested or the local port number that is used for the communication of which transfer is requested. If the origin-of-transfer-related information detecting section 102-8 detects the type of the communication of which transfer is requested, it retrieves the local port number corresponding to the type of the communication from the local port number storage section 102-4. If, for example, the type of communication is limited to IP telephony and the local port number is fixed, it does not have to retrieve the local port number but have only to retain the local port number. The origin-of-transfer-related information detecting section 102-8 may alternatively inquire the local port number being used for communication to the origin terminal of the transfer.

The record retrieving section 102-9 receives the local IP address and the local port number of the origin of transfer from the origin-of-transfer-related information detecting section 102-8 and retrieves the record describing the received local IP address and local port number from the masquerade table 101-1. Then, the record retrieving section 102-9 notifies the record rewriting section 102-14 of information for identifying the retrieved record (including the record number).

Two methods can be used for transfer of communication as described below. The first one is that the origin of transfer designates the destination of transfer. More specifically, the origin terminal of transfer holds the communication and notifies to the designated destination of transfer by way of extension that the origin terminal of transfer transfers the communication to the designated destination of transfer. Then, the origin terminal of transfer selects the designated destination of transfer after disconnecting the extension. The communication resumes as the designated destination of transfer release the communication that has been held. The second method is that the origin of transfer does not designate the destination of transfer. More specifically, the origin terminal of transfer holds the communication and the terminal that firstly releases the communication that has been held becomes the destination terminal of transfer.

The destination terminal designation receiving section 102-10 is adapted to operate for the first transfer method and receive the extension number of the destination terminal of transfer from the origin terminal of transfer.

The transfer hold receiving section 102-11 and the release terminal detecting section 102-12 are adapted to operate for the second transfer method. The transfer hold receiving section 102-11 receives a hold of communication by the origin terminal of transfer and notifies the release terminal detecting section 102-12 of that the communication is in a held state. The release terminal detecting section 102-12 detects the terminal that is firstly hooked off first as a release terminal.

The post-transfer local IP address detecting section 102-13 receives the extension number of the destination terminal of transfer from the destination terminal designation receiving section 102-10 when the first transfer method is used whereas the post-transfer local IP address detecting section 102-13 receives the extension number of the destination terminal of transfer from the release terminal detecting section 102-12 when the second transfer method is used. Then, the post-transfer local IP address detecting section 102-13 retrieves the local IP address that corresponds to the received extension number from the extension number versus local IP address correspondence table 102-2.

The record rewriting section 102-14 receives information for specifying the record to be rewritten out of the records of the masquerade table 101-1 and the local IP address to be written to the record to be rewritten (the local IP address of the destination terminal of transfer) respectively from the record retrieving section 102-9 and the post-transfer local IP address detecting section 102-13 and rewrites the record to be rewritten among the records of the masquerade table 101-1 so as to replace the local IP address in the record by the local IP address of the destination terminal of transfer. As a result of this rewriting, the transfer of communication is realized.

In principle, it is not necessary to rewrite the local port number if the local port number is determined for the type of the communication that is taking place. However, if it is necessary to change the local port number, the record rewriting section also rewrites the local port number by the new local port number on the record to be rewritten among the records of the masquerade table 101-1.

It is necessary to change the local port number, for example, when the local port number is designated by the destination terminal of transfer in the negotiation with the destination terminal of transfer or when the default local port number that is to be used by the destination terminal of transfer is occupied at present.

The record erasing section 102-15 detects the extension number or the local IP address of the terminal that has terminated a communication. If the record erasing section 102-15 detects the extension number of the terminal that has terminated a communication, the record erasing section 102-15 retrieves the local IP address that corresponds to the extension number from the extension number versus local IP address correspondence table 102-2. The record erasing section 102-15 also detects the type of the communication that has been terminated or the local port number used for the communication that has been terminated. If the record erasing section 102-15 detects the type of the communication that has been terminated, the record erasing section 102-15 retrieves the local port number that corresponds to the type of the communication from the local port number storage section 102-4. If, for example, the type of communication is limited to IP telephony and the local port number is fixed, the record erasing section 102-15 does not have to detect nor retrieve the local port number but only has to retain the local port number. The record erasing section 102-15 then erases the record that describes the detected or retrieved local IP address and the detected or retrieved local port number from the masquerade table 101-1. By doing so, the unnecessary port is closed to improve the security and prevent the unnecessary record from remaining in the masquerade table 101-1.

The presence information storage section 102-17 stores information on the current presence or absence of the user at each terminal. It also stores information on the priority of the available terminals for each user. Information for identifying a terminal may be the extension number or the local IP address of the terminal. If a terminal is identified by the extension number thereof, the information stored in the presence information storage section 102-17 will be such as illustrated in FIG. 5. If, on the other hand, a terminal is identified by the local IP address thereof, the information stored in the presence information storage section 102-17 will be such as illustrated in FIG. 6.

The presence information acquiring section 102-16 acquires the information to be stored in the presence information storage section 102-17 from each terminal by way of the terminal interface 102-6. Alternatively, the presence information acquiring section 102-16 may acquire the information to be stored in the presence information storage section 102-17 from each terminal by way of local IP network 104.

If a terminal is identified by the extension number thereof by way of the presence information storage section 102-17, the extension number detecting section 102-1 may operate in a manner as described below, using presence information, in addition to the above described operation.

When a call specifying a particular terminal is received and it is made clear from the information stored in the presence information storage section 102-17 that the user is currently absent at the terminal, the terminal having the second degree of priority is selected as terminal for receiving the call out of the terminals available to the user and the extension number of the terminal is delivered to the local IP address retrieving section 102-3. This operation is repeated until one of terminals concerned is hooked off or the call gets to the terminal having the lowest degree of priority.

When a call specifying a particular terminal is received and it is made clear from the information stored in the presence information storage section 102-17 that the user is supposed to be currently present at the terminal but the terminal is not hooked off within a predetermined period of time (e.g., 30 seconds), the terminal having the second degree of priority is selected as the terminal for receiving the call out of the terminals available to the user and the extension number of the terminal is delivered to the local IP address retrieving section 102-3. This operation is repeated until one of terminals concerned is hooked off or the call gets to the terminal having the lowest degree of priority.

If a terminal is identified by the local IP address thereof in the presence information storage section 102-17, the local IP address retrieving section 102-3 may operate in a manner as described below, using presence information, in addition to the above described operation.

When a call specifying a particular terminal is received and, as a result of receiving the extension number from the extension number detecting section 102-1 and retrieving the local IP address corresponding to the extension number from the extension number versus local IP address correspondence table 102-2, it is made clear from the information stored in the presence information storage section 102-17 that the user is currently absent at the terminal, the terminal having the second degree of priority is selected as terminal for receiving the call out of the terminals available to the user and the local IP address of the terminal is delivered to the record adding section 102-5. This operation is repeated until one of terminals concerned is hooked off or the call gets to the terminal having the lowest degree of priority.

When a call specifying a particular terminal is received and, as a result of receiving the extension number from the extension number detecting section 102-1 and retrieving the local IP address corresponding to the extension number from the extension number versus local IP address correspondence table 102-2, it is made clear from the information stored in the presence information storage section 102-17 that the user is supposed to be currently present at the terminal but the terminal is not hooked off within a predetermined period of time (e.g., 30 seconds), the terminal having the second degree of priority is selected as the terminal for receiving the call out of the terminals available to the user and the local IP address of the terminal is delivered to the record adding section 102-5. This operation is repeated until one of terminals concerned is hooked off or the call gets to the terminal having the lowest degree of priority.

Now, the operation of the own office side router 101 and that of the call control device 102 at the time of starting a communication will be described below by referring to FIG. 7.

Firstly, the negotiation section 101-3 negotiates with the partner office side server 112 to determine the global port number to be used for the communication (Step S201). Then, the extension number detecting section 102-1 detects the extension number of the terminal to be used for the communication (Step S202). Then, the local IP address retrieving section 102-3 retrieves the local IP address that corresponds to the extension number detected in Step S202 from the extension number versus local IP address correspondence table 102-2 (Step S203). The local IP address is that of the terminal to be used for the communication. Thereafter, the record adding section 102-5 determines the local port number to be used for the communication (Step S204). Then, the record adding section 102-5 adds a record describing the corresponding relationship among the global port number determined in Step S201, the local IP address retrieved in Step S203 and the local port number determined in Step S204 to the masquerade table 101-1 (Step S205).

Now, the operation of the own office side router 101 and that of the call control device 102 at the time of transferring the communication will be described below by referring to FIG. 8.

Firstly, the origin-of-transfer-related information detecting section 102-8 detects the extension number of the origin terminal of transfer (Step S211). Then, the origin-of-transfer-related information detecting section 102-8 retrieves the local IP address that corresponds to the extension number detected in Step S211 from the extension number versus local IP address correspondence table 102-2 (Step S212). Alternatively, the origin-of-transfer-related information detecting section 102-8 may directly detect the local IP address of the origin terminal of transfer in place of the detecting operation of Steps S211 and S212 (Step S213). Then, the origin-of-transfer-related information detecting section 102-8 detects the local port number that is being used for the communication (Step S214). Thereafter, the record retrieving section 102-9 retrieves the information for identifying the record describing the local IP address retrieved in Step S212 or in Step S213 and the local port number detected in Step S214 from the masquerade table 101-1 (Step S215). The record is to be rewritten.

Subsequently, the destination terminal designation receiving section 102-10 or the release terminal detecting section 102-12 detects the extension number of the destination terminal of transfer (Step S216). Then, the post-transfer local IP address detecting section 102-13 retrieves the local IP address that corresponds to the extension number of the destination of transfer detected in Step S216 from the extension number versus local IP address correspondence table 102-2 (Step S217). Alternatively, the destination terminal designation receiving section 102-10 or the release terminal detecting section 102-12 may directly detect the local IP address of the destination terminal of transfer in place of the detecting operation of Steps S216 and S217 (Step S218). Then, the record rewriting section 102-14 determines the post-transfer local port number (Step S219). Then, the record rewriting section 102-14 rewrites the record identified by the identifying information as retrieved in Step S215 so as to replace the local IP address and the local port number in the record respectively by the local IP address retrieved in Step S217 or detected in Step S218 and the local port number determined in Step S219 (Step S220).

Next, the processing operation of the own office side router 101 and that of the call control device 102 at the time of automatic transfer according to the presence information and by means of the above described first method will be described by referring to FIG. 9.

Firstly, the negotiation section 101-3 negotiates with the partner office side server 112 to determine the global port number to be used for the communication (Step S201). Then, the extension number detecting section 102-1 determines whether an extension number is designated (Step S242). If there is not any designated extension number (NO in Step S242), the extension number detecting section 102-1 detects the extension number of the terminal that is hooked off first (Step S243) and proceeds to Step S203 (FIG. 7).

If, on the other hand, there is a designated extension number (YES in Step S242), the extension number detecting section 102-1 detects the designated extension number (Step S244) and determines whether the user is present at the terminal having the extension number detected in Step S244 by referring to the information stored in the presence information storage section 102-17 (Step S245). If the user is absent at the terminal having the extension number (YES in Step S245), the processing operation proceeds to Step S248. If, on the other hand, the user is present at the terminal having the extension number (NO in Step S245), a call-in bell of the terminal having the extension number detected in Step S244 is rung up (Step S246). If the terminal is hooked off within a predetermined period of time (NO in Step S247), the processing operation proceeds to Step S203 (FIG. 7). On the other hand, if the terminal is not hooked off within the predetermined period of time (YES in Step S247), the processing operation proceeds to Step S248.

In Step S248, it is determined whether the current extension number has the lowest degree of priority by referring to the information stored in the presence information storage section 102-17 and, if the degree of priority is the lowest one (YES in Step S248), the processing operation is terminated. Simultaneous call in may be used in place of terminating the processing operation. If the degree of priority is not the lowest one (NO in Step S248), the current extension number is switched to the extension number of the terminal having the next degree of priority by referring to the information stored in the presence information storage section 102-17 (Step S249) and the processing operation returns to Step S245.

Now, the processing operation of the own office side router 101 and that of the call control device 102 at the time of automatic transfer according to the presence information and by means of the above described second method will be described by referring to FIG. 10.

Firstly, the negotiation section 101-3 negotiates with the partner office side server 112 to determine the global port number to be used for the communication (Step S201). Then, the extension number detecting section 102-1 determines whether an extension number is designated (Step S242). If there is not any designated extension number (NO in Step S242), the extension number detecting section 102-1 detects the extension number of the terminal that is hooked off first (Step S243) and proceeds to Step S203 (FIG. 7).

On the other hand, if there is a designated extension number (YES in Step S242), the extension number detecting section 102-1 detects the designated extension number (Step S244). Then, the local IP address retrieving section 102-3 retrieves the local IP address corresponding to the extension number that is detected in Step S244 from the extension number versus local IP address correspondence table 102-2 (Step S251). Then, it is determined whether the user is present at the terminal having the local IP address retrieved in Step S251 by referring to the information stored in the presence information storage section 102-17 (Step S252). If the user is absent at the terminal having the extension number (YES in Step S252), the processing operation proceeds to Step S255. If, on the other hand, the user is present at the terminal having the extension number (NO in Step S252), a call-in bell of the terminal having the extension number detected in Step S244 is rung up (Step S253). If the terminal is hooked off within a predetermined period of time (NO in Step S254), the processing operation proceeds to Step S204 (FIG. 7). On the other hand, if the terminal is not hooked off within the predetermined period of time (YES in Step S254), the processing operation proceeds to Step S255.

In Step S255, it is determined whether the current local IP address has the lowest degree of priority by referring to the information stored in the presence information storage section 102-17 and, if the degree of priority is the lowest one (YES in Step S255), the processing operation is terminated. Simultaneous call in may be used in place of terminating the processing operation. If the degree of priority is not the lowest one (NO in Step S255), the current local IP address is switched to the local IP address of the terminal having the next degree of priority by referring to the information stored in the presence information storage section 102-17 (Step S256) and the processing operation returns to Step S252.

[Embodiment 2]

The call control device 102 acquires information for identifying the record to be rewritten in the masquerade table 101 and then the record is designated by the identifying information so as to rewrite the record in the first embodiment. However, if the own office side router 101 and the call control device 102 communicate with each other according to the uPnP (Universal Plug and Play) Standard, it is not possible to acquire information necessary for identifying the record describing a combination of a particular local IP address and a particular local port number out of the records in the masquerade table 101-1. Additionally, if the own office side router 101 and the call control device 102 communicate with each other according to the uPnP Standard, it is not possible for the call control device 102 to rewrite any record in the masquerade table 101-1.

On the other hand, if the own office side router 101 and the call control device 102 communicate with each other according to the uPnP Standards, it is possible for the call control device 102 to erase a record designated by a global port number from the masquerade table 101-1 and add a record describing a desired corresponding relationship of a combination of a global IP address and a pair of a local IP address and a local port number to the masquerade table 101-1.

Therefore, the second embodiment is so adapted that no record in the masquerade table 101-1 is rewritten but any desired record can be erased and a new record can be added to replace the erased record in order to achieve an effect equivalent to that of rewriting a record. Once a record is erased, no record corresponding to the erased record exists until a new record is added as replacement. However, no problem arises because no communication takes place between the erasure of a record and the addition of a replacement record.

As shown in FIG. 11, the own office side router 101 of the second embodiment has a configuration similar to that of the own office side router 101 of the first embodiment As shown in FIG. 11, the call control device 102 of the second embodiment is partly identical with the call control device 102 of the first embodiment but partly different from the latter. More specifically, the call control device 102 of the second embodiment has a replica 102-50 of the masquerade table, an extension number detecting section 102-51, an extension number versus local IP address correspondence table 102-52, a local IP address retrieving section 102-53, a local port number storage section 102-54, a record adding section 102-55, a terminal interface 102-56, a local IP address assigning section 102-57, an origin-of-transfer-related information detecting section 102-58, a record retrieving section 102-59, a destination terminal designation receiving section 102-60, a transfer hold receiving section 102-61, a release terminal detecting section 102-62, a post-transfer local IP address detecting section 102-63, a record erasing section 102-65, a presence information acquiring section 102-66 and a presence information storage section 102-67.

The replica 102-50 of the masquerade table has a configuration same as that of the masquerade table 101-1 and stores the records same as those of the latter. The replica 102-50 of the masquerade table does not have a field for global IP addresses like the masquerade table 101-1. In the following description, it is assumed that there is no field for global IP addresses.

The extension number detecting section 102-51 is similar to the extension number detecting section 102-1 of the first embodiment.

The extension number versus local IP address correspondence table 102-52 is similar to the extension number versus local IP address correspondence table 102-2 of the first embodiment.

The local IP address retrieving section 102-53 is similar to the local IP address retrieving section 102-3 of the first embodiment The local port number storage section 102-54 is similar to the local port number storage section 102-4 of Embodiment 1.

At the time of signaling, the record adding section 102-55 receives the global IP address and the global port number to be used for the coming communication from the negotiation section 101-3. Note, however, that it is not necessary for the record adding section 102-55 to receive the global IP address from the negotiation section 101-3 if the global IP address of the own office side router 101 is known or if no field is provided for global IP addresses in the masquerade table 101-1 and the replica 102-50 of the masquerade table. Additionally, at the time of signaling, the record adding section 102-55 receives the local IP address to be used for the coming communication (the local IP address of the terminal to be used for the coming communication) from the local IP address retrieving section 102-53. Furthermore, at the time of signaling, the record adding section 102-55 receives the local port number to be used for the coming communication from the local port number storage section 102-54. Then, the record adding section 102-55 adds a record describing the global IP address, the global port number, the local IP address and the local port number it received to the masquerade table 101-1 and the replica 102-50 of the masquerade table. Note, however, that the added record describes only the global port number, the local IP address and the local port number if no field is provided for global IP addresses in the masquerade table 101-1 and the replica 102-50 of the masquerade table.

Additionally, after the record erasing section 102-65 has erased a record, the record adding section 102-55 subsequently operates for transfer of communication in a manner as described below. Namely, the record adding section 102-55 receives the global port number to be described in the record to be added from the record retrieving section 102-59. Additionally, the record adding section 102-55 receives the post-transfer local IP address to be described in the record to be added from the post-transfer local IP address detecting section 102-63. Furthermore, the record adding section 102-55 retrieves the local port number to be described in the record to be added from the local port number storage section 102-54 depending on the type of communication. Note, however, the local port number to be described in the record to be added may be determined by negotiating with the destination terminal of transfer. Then, the record adding section 102-55 adds the received global port number, the received local IP address and the retrieved or determined local port number to the masquerade table 101-1 and the replica 102-50 of the masquerade table.

The terminal interface 102-56 is similar to the terminal interface 102-6 of the first embodiment.

The local IP address assigning section 102-57 is similar to the local IP address assigning section 102-7 of the first embodiment.

The origin-of-transfer-related information detecting section 102-58 is similar to the origin-of-transfer-related information detecting section 102-8 of the first embodiment.

The record retrieving section 102-59 receives the local IP address and the local port number of the origin of transfer from the origin-of-transfer-related information detecting section 102-58 and retrieves the record describing the local IP address and the local port number from the replica 102-50 of the masquerade table. Then, the record retrieving section 102-59 notifies the record erasing section 102-65 and the record adding section 102-55 of the global port number described in the retrieved record.

The destination terminal designation receiving section 102-60 is similar to the destination terminal designation receiving section 102-10 of the first embodiment. The transfer hold receiving section 102-61 is similar to the transfer hold receiving section 102-11 of the first embodiment.

The release terminal detecting section 102-62 is similar to the release terminal detecting section 102-12 of the first embodiment.

The post-transfer local IP address detecting section 102-63 is similar to the post-transfer local IP address detecting section 102-13 of the first embodiment.

At the time of transfer of communication, the record erasing section 102-65 operates in a manner as described below. Namely, the record erasing section 102-65 acquires the global port number, described in the record that describes the local IP address and the local port number of the origin of transfer, from the record retrieving section 102-59. Then, the record erasing section 102-65 erases the record that describes the global port number acquired from the record retrieving section 102-59 from the masquerade table 101-1 and the replica 102-50 of the masquerade table.

At the time of end of communication, the record erasing section 102-65 operates in a manner as described below. Namely, the record erasing section 102-65 detects the extension number or the local IP address of the terminal that has terminated a communication. If the record erasing section 102-65 detects the extension number of a terminal that has terminated a communication, the record erasing section 102-65 retrieves the local IP address corresponding to the extension number from the extension number versus local IP address correspondence table 102-52. The record erasing section 102-65 also detects the type of the communication that has been terminated or the local port number used for the communication that has been terminated. If the record erasing section 102-65 detects the type of the communication that has been terminated, the record erasing section 102-65 retrieves the local port number that corresponds to the type of the communication from the local port number storage section 102-54. If, for example, the type of communication is limited to IP telephony and the local port number is fixed, the record erasing section 102-65 does not have to detect nor retrieve the local port number but only has to retain the local port number. Then, the record erasing section 102-65 requests the record retrieving section 102-59 to retrieve the global port number described in the record that describes the detected or retrieved local IP address and the detected or retrieved local port number from the replica 102-50 of the masquerade table and acquires the global port number retrieved by the record retrieving section 102-59. Then, the record erasing section 102-65 erases the record that describes the global port number acquired from the record retrieving section 102-59 from the masquerade table 101-1 and the replica 102-50 of the masquerade table. By doing so, the unnecessary port is closed to improve the security and prevent the unnecessary record from remaining in the masquerade table 101-1 and the replica 102-59 of the masquerade table.

The presence information acquiring section 102-66 is similar to the presence information acquiring section 102-16 of the first embodiment.

The presence information storage section 102-67 is similar to the presence information storage section 102-17 of the first embodiment.

Next, the operation of the own office side router 101 and that of the call control device 102 at the time of starting a communication will be described below by referring to FIG. 12.

Firstly, the negotiation section 101-3 negotiates with the partner office side server 112 to determine the global port number to be used for the communication (Step S301). Then, the extension number detecting section 102-51 detects the extension number of the terminal to be used for the communication (Step S302). Then, the local IP address retrieving section 102-53 retrieves the local IP address that corresponds to the extension number detected in Step S302 from the extension number versus local IP address correspondence table 102-52 (Step S303). The local IP address is that of the terminal to be used for the communication. Thereafter, the record adding section 102-55 determines the local port number to be used for the communication (Step S304). Then, the record adding section 102-55 adds a record describing a relationship between the global port number determined in Step S301 and a pair of the local IP address retrieved in Step S303 and the local port number determined in Step S304 to the masquerade table 101-1 (Step S305). Then, the record adding section 102-55 adds a record identical with the record added to the masquerade table 101-1 in Step S305 to the replica 102-50 of the masquerade table (Step S306).

Now, the operation of the own office side router 101 and that of the call control device 102 of the second embodiment 2 at the time of transferring the communication will be described below by referring to FIG. 13.

Firstly, the origin-of-transfer-related information detecting section 102-58 detects the extension number of the origin terminal of transfer (Step S311). Then, the origin-of-transfer-related information detecting section 102-58 retrieves the local IP address that corresponds to the extension number detected in Step S311 from the extension number versus local IP address correspondence table 102-52 (Step S312). Alternatively, the origin-of-transfer-related information detecting section 102-58 may directly detect the local IP address of the origin terminal of transfer in place of the detecting operation of Steps S311 and S312 (Step S313). Then, the origin-of-transfer-related information detecting section 102-58 detects the local port number that is being used for the communication (Step S314). Thereafter, the record retrieving section 102-59 retrieves the global port number described in the record that describes the local IP address retrieved in Step S312 or detected in Step S313 and the local port number detected in Step S314 from the replica 102-50 of the masquerade table (Step S315). Then, the record erasing section 102-65 erases the record describing the global port number retrieved in Step S315 from the masquerade table 101-1 (Step S316) and the record describing the global port number retrieved in Step S315 from the replica 102-50 of the masquerade table (Step S317).

Subsequently, the destination terminal designation receiving section 102-60 or the release terminal detecting section 102-62 detects the extension number of the destination terminal of transfer (Step S318). Then, the post-transfer local IP address detecting section 102-63 retrieves the local IP address that corresponds to the extension number of the destination of transfer detected in Step S318 from the extension number versus local IP address correspondence table 102-52 (Step S319). Alternatively, the destination terminal designation receiving section 102-60 or the release terminal detecting section 102-62 may directly detect the local IP address of the destination terminal of transfer in place of the detecting operation of Steps S318 and S319 (Step S320). Then, the record adding section 102-55 determines the post-transfer local port number (Step S321). Then, the record adding section 102-55 adds a record describing the global port number retrieved in Step S315, the local IP address retrieved in Step S319 or the local IP address detected in Step S320 and the local port number determined in Step S321 to the masquerade table 101-1 (Step S322) and a record describing the same contents as the record added in Step S322 to the replica 102-50 of the masquerade table (Step S323).

Next, the processing operation of the own office side router 101 and that of the call control device 102 of Embodiment 2 at the time of automatic transfer according to the presence information and by means of the above described first method will be described by referring to FIG. 14.

It will be clear by comparing FIG. 9 and FIG. 14 that a processing operation same as that of the first embodiment takes place in the second embodiment. Note, however, that the processing operation proceeds to Step S303 (FIG. 12) after Step S243 if the outcome of determination in Step S242 is NO and proceeds to Step S303 (FIG. 12) if the outcome of determination in Step S247 is NO.

Now, the processing operation of the own office side router 101 and that of the call control device 102 of the second embodiment 2 at the time of automatic transfer according to the presence information and by means of the above described second method will be described by referring to FIG. 15.

It will be clear by comparing FIG. 10 and FIG. 15 that a processing operation same as that of the first embodiment takes place in the second embodiment 2. Note, however, that the processing operation proceeds to Step S303 (FIG. 12) after Step S243 if the outcome of determination in Step S242 is NO and proceeds to Step S304 (FIG. 12) if the outcome of determination in Step S254 is NO.

To have the person at the partner office hear a melody representing hold, it is only necessary to assign a local IP address and a local port number to a sound source of the melody representing hold and transfer it to the local IP address and the local port number.

The present invention is applicable to transfer of IP communications.

What is claimed is:

1. A communication transfer apparatus comprising:
a presence information storage section which stores information on presence or absence of a user at each terminal and information on priorities of terminals for each of users, wherein said terminals for each of users are located in a local IP network to which a common global Internet Protocol address is assigned;
a masquerade table including a plurality of records, on each of which recorded is a global Internet Protocol address common among said plurality of records, a global port number, a local Internet Protocol address, and a local port number;
a called terminal detecting section which detects a called terminal based on signals received via a global IP network or outputs fnmn said terminals;
a presence determining section which determines presence or absence of a user at the called terminal detected by said called terminal detecting section by referring to the information on presence or absence of said user at the detected called terminal stored in said presence information storage section;
a transfer destination identifying section which identifies a terminal having a next priority by referring to the information on priorities a terminals for said user at the detected called terminal stored in said presence information storage section if said presence determining section determines absence of a user at the called terminal detected by said called terminal detecting section; and
a record rewriting section which retrieves a record which corresponds to the called terminal from said masquerade table including said plurality of records and changes a local Internet Protocol address of the retrieved record into a local Internet Protocol address of the terminal identified by said transfer destination identifying section,
wherein two or more transfers take place with respect to two or more different called terminals located in the local IP network to which the common global Internet Protocol address is assigned.

2. The communication transfer apparatus according to claim 1, wherein
said record rewriting section changes the local Internet Protocol address which corresponds to said called terminal without changing the global port number which corresponds to said called terminal in said masquerade table.

3. The communication transfer apparatus according to claim 1, wherein
said transfer destination identifying section relates as pair of said local Internet Protocol address and said local port number not only to said global Internet Protocol address but also to a global port number in said masquerade table.

4. A communication transfer apparatus comprising:
a priority storing section which stores information on priorities of IP terminals for each of users, wherein said IP terminals for each of users are located in a local IP network to which a common global Internet Protocol address is assigned;
a masquerade table including, a plurality of records, on each of which recorded is a global Internet Protocol address common among said plurality of records, a global port number, a local Internet Protocol address, and a local port number;
a called IP terminal detecting section which detects a called IP terminal based on signals received via as global IP network or outputs from said IP terminals;
a presence determining section which determines execution or non-execution of a hooking off operation at the called IP terminal detected by said called IP terminal detecting section within a predetermined period of time:,
a transfer destination identifying section which identifies an IP terminal having a priority next to a priority of the called IP terminal by referring to the information on priorities of IP terminals for said user at the detected called IP terminal stored in said priority storing section if said presence determining section determines non-execution of the hooking off operation at the called IP terminal detected by said called IP terminal detecting section within the predetermined period of time, wherein the transfer destination identifying section is disposed in a local IP network where said called IP terminal and said identified IP terminal are disposed; and
a record rewriting section which retrieves a record which corresponds to the called IP terminal from said masquerade table including said plurality of records and changes a local Internet Protocol address of the retrieved record into a local Internet Protocol address of the IP terminal identified by said transfer destination identifying section,
wherein two or more transfers take place with respect to two or more different called IP terminals located in the local IP network to which the common global Internet Protocol address is assigned.

5. A communication transfer method comprising:
a presence information storing step of storing information on presence or absence of a user at each terminal and information on priorities of terminals for each of users to a record medium, wherein said terminals for each of users are located in a local IP network to which a common global Internet Protocol address is assigned;
a masquerade table storing step of storing a masquerade table including a plurality of records, on each of which recorded is a global Internet Protocol address common among said plurality of records, a global port number, a local Internet Protocol address, and a local port number;
a called terminal detecting step of detecting a called terminal based on signals received via a global IP network or outputs from said terminals;
a presence determining step of determining presence or absence of a user at the called terminal detected by said called terminal detecting step by referring to the information on presence or absence of said user at the detected called terminal stored in said record medium;

a transfer destination identifying step of identifying a terminal having a next priority by referring to the information on priorities of terminals for said user at the detected called terminal stored in said record medium if said presence determining step determines absence of a user at the called terminal detected by said called terminal detecting step; and a record rewriting step of retrieving a record which corresponds to the called terminal from said masquerade table including said plurality of records and changing a local Internet Protocol address of the retrieved record into a local Internet Protocol address of the terminal identified by said transfer destination identifying step, wherein two or more transfers take place with respect to two or more different called terminals located in the local IP network to which the common global Internet Protocol address is assigned.

6. A communication transfer method comprising:

a priority storing step of storing information on priorities of IP terminals for each of users to a record medium, wherein said IP terminals for each of users are located in a local IP network to which a common global Internet Protocol address is assigned;

a masquerade table storing step of storing a masquerade table including a plurality of records, on each of which recorded is a global Internet Protocol address common among said plurality of records, a global port number, a local Internet Protocol address, and a local port number;

a called IP terminal detecting step of detecting a called IP terminal based on signals received via a global IP network or outputs front said IP terminals;

a presence determining step of determining execution or non-execution of a hooking off operation at the called IP terminal detected by said called IP terminal detecting step within a predetermined period of time;

a transfer destination identifying step of identifying an IP terminal having a priority next to a priority of the called IP terminal by referring to the information on priorities of IP terminals for said user at the detected called IP terminal stored in said record medium if said presence determining step determines non-execution of the hooking off operation at the called IP terminal detected by said called IP terminal detecting step within the predetermined period of time, wherein the transfer destination identifying section is disposed in a local IP network where said called IP terminal and said identified IP terminal are disposed; and a record rewriting step of retrieving a record which corresponds to the called IP terminal from said masquerade table including said plurality of records and changing a local Internet Protocol address of the retrieved record into a local Internet Protocol address of the IP terminal identified by said transfer destination identifying step, wherein two or more transfers take place with respect to two or more different called terminals located in local IP network to winch the common global Internet Protocol address is assigned.

* * * * *